United States Patent [19]

Richter et al.

[11] 3,748,967

[45] July 31, 1973

[54] POSITION-CONTROL DEVICE OPERATED BY FLUID PRESSURE

[75] Inventors: Rudolf Richter, Hosbach; Walter Kropp, Obernau, both of Germany

[73] Assignee: Linde Aktiengesellschaft, Wiesbaden, Germany

[22] Filed: Nov. 5, 1970

[21] Appl. No.: 87,294

[30] Foreign Application Priority Data
Nov. 6, 1969   Germany.................. P 19 55 926.3

[52] U.S. Cl....................... 91/387, 91/461, 92/131
[51] Int. Cl.............................................. F15b 13/16
[58] Field of Search....................... 91/51, 387, 461; 92/131

[56] References Cited
UNITED STATES PATENTS

| | | | |
|---|---|---|---|
| 3,003,475 | 10/1961 | Rouvalis | 91/387 |
| 3,511,134 | 5/1970 | Wittren | 91/387 |
| 2,947,285 | 8/1960 | Baltus et al. | 91/51 |
| 3,076,442 | 2/1963 | Raeber | 91/51 |
| 3,515,032 | 6/1970 | Dezelan et al. | 91/51 |

*Primary Examiner*—Paul E. Maslousky
*Attorney*—Karl F. Ross

[57] ABSTRACT

A control device for positioning a body, e.g. a valve, slide or actuator for a stepless hydrostatic transmission in which a control piston is displaced by a control fluid pressure and a working piston is coupled with the actuated member for movement in response to the control pressure independently of external influences upon it. The control piston operates a valve which regulates fluid flow to and from a displacement chamber in which the working piston is shiftable, a spring being disposed within this chamber and acting upon the control piston with a force determined by the position of the working piston.

8 Claims, 3 Drawing Figures

INVENTORS,
RUDOLF RICHTER
WALTER KROPP

BY Karl F. Ross

ATTORNEY

RUDOLF RICHTER
WALTER KROPP
INVENTORS.

BY  Karl F. Ross

ATTORNEY

POSITION-CONTROL DEVICE OPERATED BY FLUID PRESSURE

FIELD OF THE INVENTION

Our present invention relates to fluid-responsive control devices and, more particularly, to a fluid-responsive control system for positioning a working member in response to a control pressure.

BACKGROUND OF THE INVENTION

Hydraulic and pneumatic actuators of many types have been proposed heretofore. Such systems include direct-acting arrangements in which the fluid pressure applied to a control piston acts against the restoring force of a spring to displace the control piston and a working member operatively connected therewith. In another type of control, the control piston operates a valve which regulates fluid flow to and from a double-acting follower cylinder in which a working piston is shiftable to displace the controlled member. In both the latter case and the former, frictional resistance of the control piston or the working piston and resistance at the actuated member to be displaced add to the force of the restoring spring and defeat the desired linearity or proportionality between a pressure-change increment at the control piston and a position-change increment at the actuating member. Practically all of the fluid-responsive control systems combine the two arrangements mentioned earlier and, consequently, involve the same disadvantages. Since the force which adds to the restoring force of the spring may be unpredictable or may vary with the position of the actuated member, compensating arrangements in which special springs are provided, are not always successful in overcoming the disadvantages.

OBJECTS OF THE INVENTION

It is, therefore, the principal object of the present invention to provide a fluid-responsive control system for the position of an actuated member which will be independent of the external influences mentioned above and especially resisting and conteracting forces developed within the control system and applied at the actuated member.

It is another object of our invention to provide an improved control system in which an actuated member is positioned in response to a control pressure randomly and selectively.

A further object of this invention is to increase the versatility and adaptivity of a fluid-responsive position control for the purposes described.

SUMMARY OF THE INVENTION

These objects and others, which will become apparent hereinafter, are attained, in accordance with the present invention, with a control system having a control piston subjected to the control pressure and acting upon a valve controlling the fluid flow to and from a displacement chamber in which a working piston is shiftable, the latter piston being coupled with the member to be actuated. According to the principles of this invention, a restoring spring means acts upon the control piston and its valve in opposition to the control pressure with a restoring force or a resisting force which is determined by and dependent upon the position of the working piston. More specifically, the spring means includes a spring seat received within the displacement chamber and engaged by the working piston for displacement thereby, the other spring seat acting upon the valve, e.g. via a force-transmitting pin. In this arrangement, the control piston is automatically in an equilibrium between the control pressure and the countervailing force of the spring means, the latter being determined by the position of the working piston. Each position of the valve and control piston thus corresponds to a particular position of the working piston and the position of the working piston is determined solely by the amplitude of the control pressure and establishes the degree of compression of the spring which acts upon the control piston. Furthermore, since the working piston is shiftable in a displacement chamber or cylinder, the position of the working piston is established by the liquid volume of this chamber as controlled by the valve operated by the control piston. External forces, e.g. friction and resisting forces, are taken up by the incompressible fluid within the displacement chamber in the closed position of the valve and hence are not able to affect the restoring force of the spring. They have, therefore, no influence upon the control piston.

According to a more specific feature of this invention, the control piston, spring means, valve and working piston are axially aligned in a single housing which is formed with a bore axially receiving the valve and control piston. The valve and control pistons are constructed as a single member or body having a piston head at one end which is slidably received in the control cylinder, the latter communicating with a source of the control pressure, e.g. an electromagnetic valve. At the other end of this body is provided a valve shoulder so that the head and shoulder are axially spaced apart by an annular groove, the flanks of which constitute valve edges of a spool or slide valve regulating the flow of fluid to and from an annular chamber formed between these flanks and communicating with the displacement chamber. With the control piston withdrawn, a clearance is provided enabling the flow of fluid from an annular compartment between the duct communicating with the displacement chamber and the control cylinder into the displacement chamber. In the other position of the valve, fluid is permitted to drain from the displacement chamber into a reservoir.

Furthermore, we prefer to provide a force-transmitting pin between the control piston and the valve seat acting thereon and to dimension this pin so that it functions purely as a mechanical force-transmitting member with the fluid pressure on opposite sides thereof in complete balance.

When the working piston is under load in its normal state, i.e., tends to be biased against the spring force because nature of the actuated member, a single control piston and spring means suffices to determine the position of the actuated member. On the other hand, when the actuated member has a "neutral" position in which it is unbiased and two-way movement from this position is desired, it is necessary to employ two-control pistons or a dual-acting control piston in accordance with the principles set forth above.

According to still another feature of this invention, the spring means is prestressed, i.e., is received between its spring seats with precompression, to maintain the working piston in its neutral position with a minimum of stored energy being retained in the spring means in this neutral position. To displace the working piston against the force of the spring and the resisting forces of the device to be actuated, we prefer to provide a hydraulic pressure network having a pump or the like.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
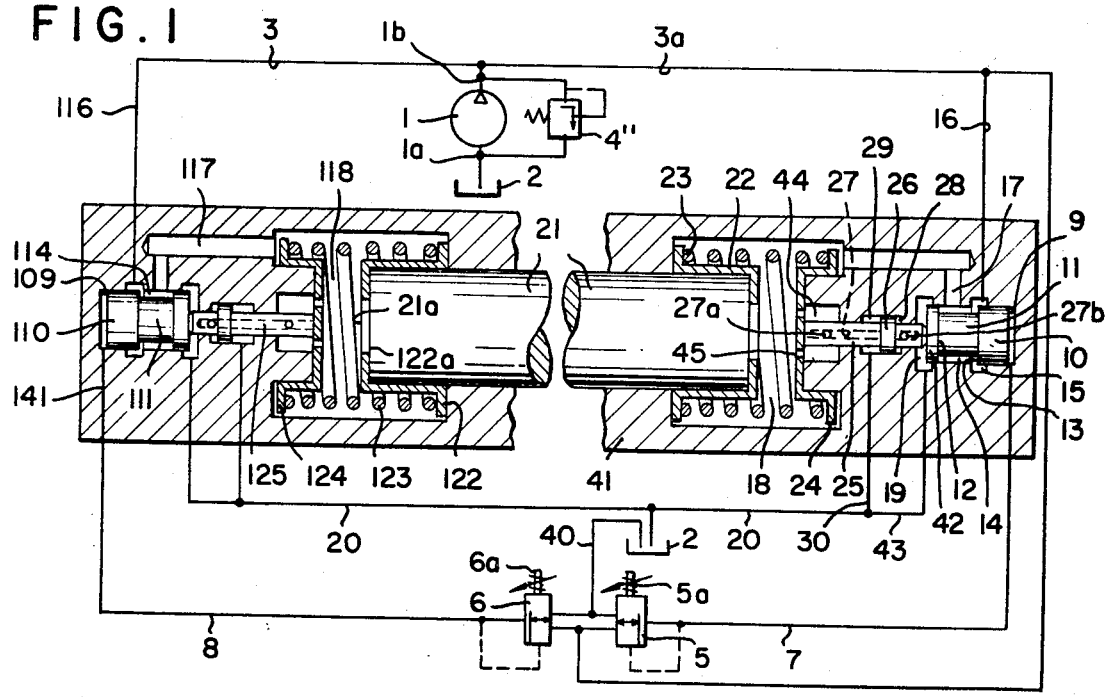
FIG. 1 is a diagram of the control arrangement according to the invention, having a mechanical return to the neutral position.

The pump 1 has its intake side 1a communicating with a reservoir 2 of hydraulic fluid and a pressure or discharge side 1b which supplies a hydraulic line 3 protected against excess fluid pressure by a pressure relief valve 4 shunting the pump 1. Consequently, when no fluid is drawn from line 3, the outflow of the pump 1 is bypassed to the reservoir 2 by pressure-relief valve 4.

A branch 3a of the hydraulic line connects the discharge side of pump 1 to randomly or selectively operated valves 5 and 6 constituting control-pressure regulators, the latter being actuated by means not shown. The actuating means may include energizing circuits for the coils 5a and 6a of the valves with arrangement that only one of the pair can be actuated at any time. In other words, the valves 5 and 6 are actuated in the alternative.

The valve 5 connects, in one position, a line 7 with the pressure line 3a and, in another position, ties the line 7 to a return 40 to the reservoir 2. Line 7 communicates with a control hydraulic cylinder in the form of a relatively small-diameter axial bore of a housing 41. A piston 10 is axially shiftable in this bore and carries a valve body or slide 11 which co-operates with an edge 42 as will be apparent hereinafter. The edge 12 of this valve forms a variable cross-section passage with the edge 42. The valve 11 is received in a valve bore 14 axially aligned with the chamber 9.

Annular chamber 15 is provided between the valve chamber 14 and the control cylinder 9 and communicates via a branch 16 with the high-pressure side 3a of the hydraulic network.

The head 11 of the valve is received in a chamber 19 which communicates via a branch line 43 with the return conduit 20 of the hydraulic network, the conduit 20 opening into the reservoir 2. Axially spaced ahead of the piston 10 and valve 11, is a compression or throttling chamber 18 which communicates via a branch 17 with the valve chamber 19. The working piston 21 of the system extends axially into the chamber 18 and engages a spring seat 22 which bears against a helical compression spring 23 surrounding the end of the working piston 21 projecting into the chamber 18. The spring 23 bears upon a further spring seat 24 which, in turn, can axially press a pressure pin 25 to the right. The pin 25 has a head or shoulder 26 which is axially shiftable in a chamber 28 of smaller diameter and cross-section than the chambers previously mentioned. The shoulder 26 divides the chamber 28 into a left-hand compartment 29 which communicates via line 30 with the return duct 20 and a chamber to the right-hand side of the shoulder which can communicate through an axial bore 27 in this pressure pin and a pair of axially spaced radial ports 27a and 27b. A similar structure is provided at the opposite end of the working piston 21 which may be coupled to the swash plate or swingable cylinder barrel of an axial-piston pump for controlling the stroke thereof and a transmission in which the pump is connected. The parts of the left-hand housing 141, which has the same functions as those of the corresponding right-hand parts, are indicated with the same numeral preceded by a "1" in the hundreds place.

As previously suggested, the valve 6, which may be operated alternatively to valve 5 in an exclusive "or" sense, whereby only one of the valves or neither valve may be operated at any time, alternately connects the line 8 with either the line 3a or the line 40, communicating respectively with the pressure side of the pump and the reservoir. The line 8 delivers fluid 2 or drains the control cylinder 109 in which the piston 110 is axially shiftable to displace a valve body 111. Line 116 connects the annular chamber ahead of the piston 110 with the pressure side of the pump while a duct 117 communicates between the chamber surrounding the valve 111 and the throttle chamber 118. A valve seat 122 bears against the left-hand side of the working piston 21 and is urged by a helical compression spring 123 to the right, the spring reacting against a seat 124 which bears upon the pressure pin 125.

Of course, the valves 5 and 6, which may be manually actuated, are operated in see-saw fashion, i.e., when one applies pressure via one of the valves 5 or 6 to the respective cylinder 9 or 109, the other valve (5 or 6) connects the other cylinder (9 or 109) to the reservoir, and vice versa.

Upon actuation of the control-pressure regulator 5, we are able to set the pressure in the line 7 to a randomly selected level and, correspondingly, the alternative operation of the valve 6 may establish in line 8 a randomly selected pressure. With a pressure increase in line 7, the pressure rises correspondingly in cylinder 9 and tends to shift the control piston 10 to the left. In the position of the system illustrated in the drawing, the control piston 10 has been shifted to the right by the force-restoring spring means, so that the edge 13 opens communication between the pressure line 16 and the duct 17. When the control piston 10 is shifted further to the left, edges 12 and 13 close the opposite ends of the valve chamber 14 so that the fluid medium neither enters the duct 17 nor is withdrawn therefrom. Still further movement of the piston 10 to the left shifts the edge 12 to communicate between the duct 17 and the annular chamber 19 and thereby connects the duct 17 with the return line 20 via a branch 43.

In the neutral position of the system, represented in FIG. 1, the spring seats 22 and 24 lie against opposite housing portions defining the chamber 18 and the spring 23 is precompressed between them. A movement of the piston 10 to the left is transmitted via a pressure pin 25 to the spring seat 24 and yields a further compression of the spring 23 so that an opposing movement of the piston 21 must overcome a proportionately greater resistance. The pressure pin 25 is exposed, at its left side, to the pressure in chamber 18 via a compartment 44 which communicates with the chamber 18 through aperture 45 in the plate 24. So that this pressure does not act upon the pin 25 in addition to the spring force, the pin 25 is provided with the shoulder 26 whose annular effective surface area is dimensioned to equal exactly that of the left-hand end face of the pin 25 and the bore 27 applies the same pressure to the compartment 28. The opposite side of the shoulder is at the pressure of the return line 30, 20. Consequently, the member 25 acts only as a mechanical force-transmitting body.

In operation, there are three essential modes corresponding to an unactuated state of both valves 5 and 6, to the activation of valve 5 exclusively and the activation of valve 6 exclusively. When neither of the control pressure-regulating valves 5 and 6 are unactuated or one is unactuated while the other is connected to the return 40, the lines 7 and 8 remain pressureless and fluid is bypassed to the reservoir 2 by the valve 4. Members 18 and 118 sustain no elevated pressure, e.g. may be at the reservoir pressure, so that the working piston 21 controlling the installation is biased into its control position by the spring 23 and 123. The length of piston 21 is therefore selected to correspond to the distance between the faces engaged thereby of the spring seats 22 and 122 when the latter are seated against the end walls of the respective chambers 18 and 118.

When activation of valve 5 results in pressurization of line 7, the selector 9 is pressurized to shift the piston 10 to the left, i.e., in the direction of the chamber 18. The valve portion 11 of the piston 10 establishes communication between the duct 17 and the chamber 19 to connect this duct with the return line 20. Since, simultaneously, the duct 117 connects the chamber 114 with chamber 118 and chamber 114 is under the pump pressure delivered to conduit 116, the piston 21 is urged to the right by the fluid pressure generated in chamber 18 and applied to the piston and wall 21a through an opening 122a in the seat 122. To a corresponding extent, fluid is driven from chamber 18 and delivered via duct 17, chamber 19 and line 20 to the reservoir. The spring 23 is compressed by the spring seat 22 which is carried by the piston 21. As a result, the spring seat 24 bears with greater force upon the pin 25 and, indirectly, upon the piston 10. As soon as this resistive force equals the force applied to the piston 10 in chamber 9, movement stops and equilibrium is reached. This is designed to correspond to a position of the valve 11 in which the edges 12 and 13 block the chamber 14 and prevent flow of fluid from and to the chamber 18. The working piston 21 thus has a position determined by the control pressure in line 7. Even if chamber 14 is incompletely closed off, the equilibrium position of the member 21 will conform to the pressure applied in chamber 9.

Should the pressure in line 7 be reduced, the piston 10 is biased to the right to enable the pump 1 via lines 3 and 16 and the valve 11 to introduce fluid through duct 17. The spring 23 is thereby relieved.

As a result, the control piston 10 is shifted further to the left in spite of the reduced pressure in control cylinder 9, until the edges 12 and 13 close the bore 14. The working piston 21 then assumes a position in which the force of spring 23 is balanced by the fluid pressure applied to the control piston 10 and is immobilized in this position. It will be self-evident that all of the other influences upon the working piston 21 are applied to the fluid in chamber 18 and that this fluid is sealed within the chamber. The fluid, being substantially incompressible, locks the working piston 21 in its position as effectively as a mechanical lock.

When the valve 6 is actuated to displace the working piston 21 in the opposite direction, the same relationship holds and eventually the piston 21 assumes a position in which the spring force balances the control pressure applied to the control piston 110 whereupon the valve 111 closes communication to and from the displacement chamber 118.

Figure 2:
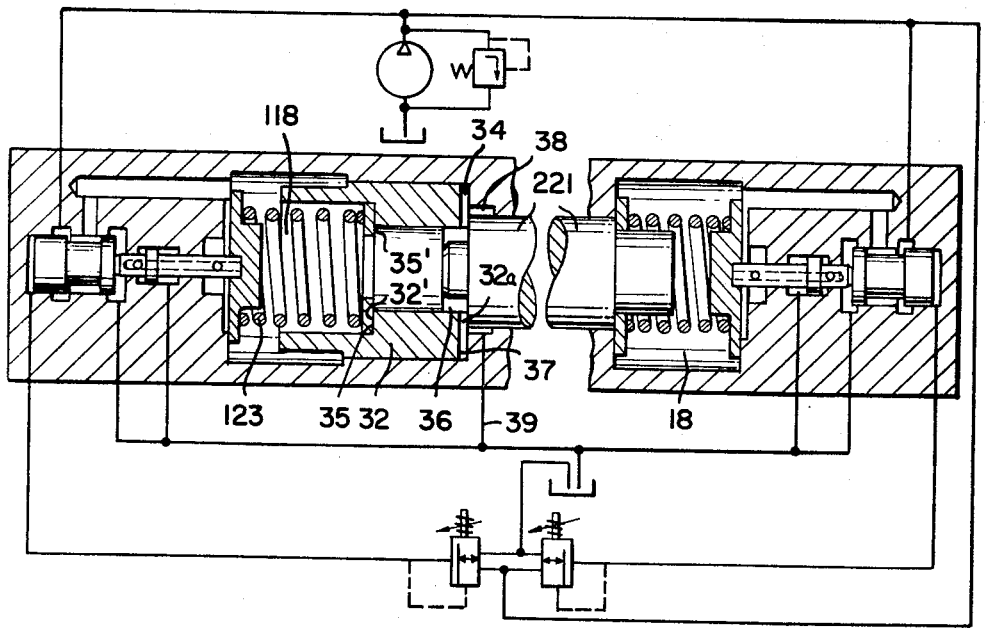
FIG. 2 is a diagram of the control system as provided with a hydraulic return.

In the embodiment illustrated in FIG. 2, the working piston 221 is provided at its left-hand side with a stud 31 axially shiftable in the sleeve 32 which, in turn, is axially slidable in the cylinder bore 34. The spring 123 bears against a spring seat or plate 35, resting against the sleeve 32 at the end of the latter opposite the end in which the inner bore 36 of the sleeve 32 communicates with a compartment therebehind. Moreover, the spring seat 35 has a shoulder 35' in the path of the stud 31 so that relative axial movement of the stud and the sleeve 32, to shift the stud 31 to the left with respect to the sleeve, will lift the spring seat 35 from the shoulder 32' of the sleeve 32.

In the mutual position of the working piston 221, the sleeve 32 lies with its right-hand face 32a against the shoulder 37 of the housing. When, however, the working piston 221 is shifted to the left, the fluid displacement in chamber 118 applies its rising pressure over the full cross-section of cylinder bore 34. Since this cross-section is larger than the cross-section of the working piston 32, a force is produced tending to shift member 221 into its neutral position even when the same fluid pressure is generated in both chambers 18 and 118. In the event of an external force applied to the working piston 221 in the right-hand direction (FIG. 2), the pressure in chamber 18 at the right-hand side of the piston 221 rises accordingly. However, at the left-hand side of the piston 221, the pressure is applied via the stud 31 to the displacement chamber 118 to alter the pressure in the latter precisely in step with the pressure in chamber 18. Since the cross-section of the stud 31 is less than the cross-section of the working piston 21, the force developed on the latter overcomes the force at the stud 31 to relocate the piston 21 in its neutral position. The chamber 38 to which the right-hand side of the sleeve 31 is exposed, is connected to the reservoir by a line 39 and thereby held pressureless. Otherwise, the system of FIG. 2 operates as described for the arrangement of FIG. 1.

Figure 3:
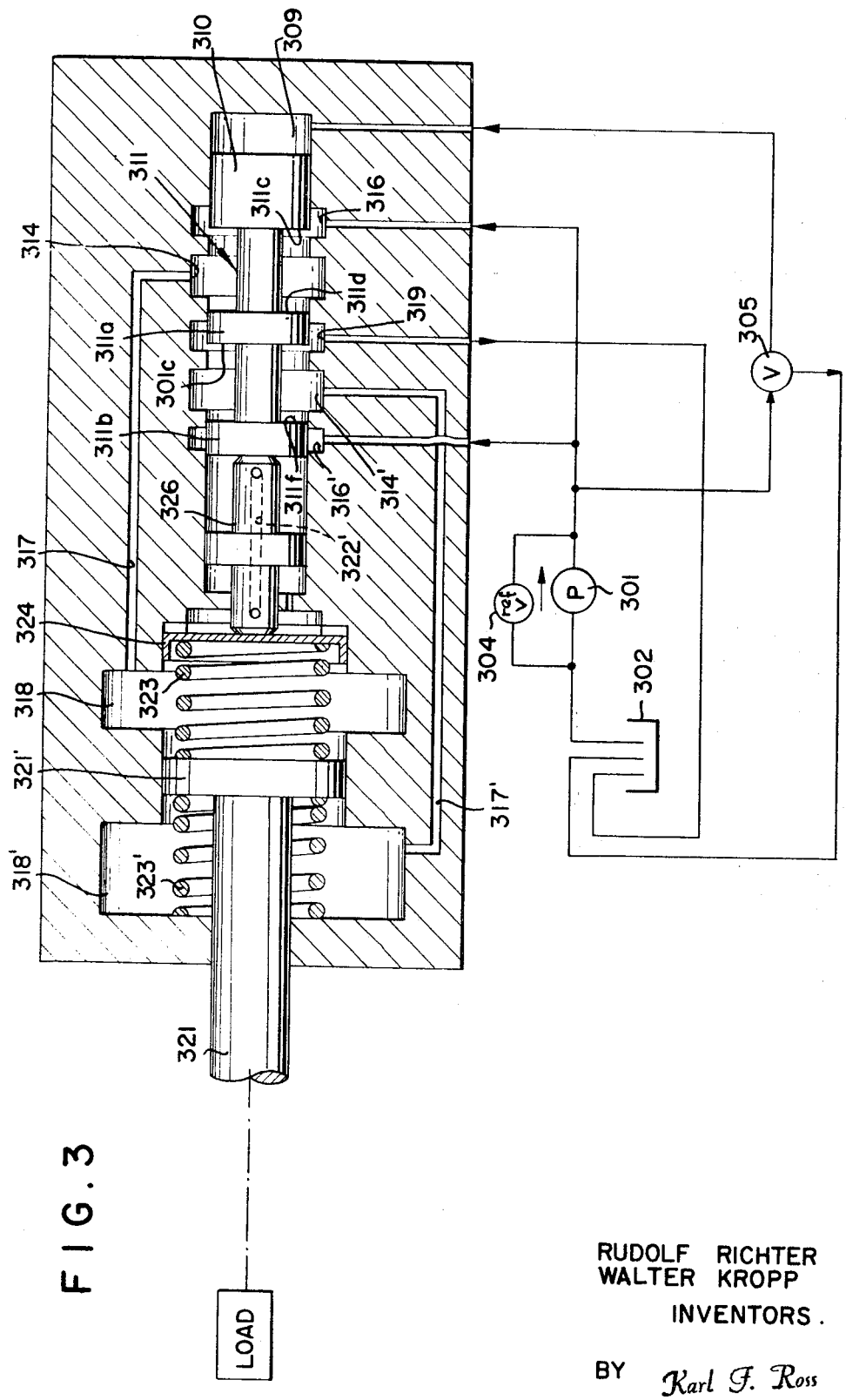
FIG. 3 is a diagrammatic cross-sectional view illustrating another embodiment of the invention.

In FIG. 3, we show another arrangement in accordance with the present invention utilizing the principles set forth above with, however, the control system provided solely at the right-hand side of the working piston 321. The latter is biased into its neutral position by a pair of springs 323 and 323' received within displacement chambers 318 and 318' on opposite sides of a head 321' of the working piston. The spring 323 acts upon a seat 324 which rests against a force-transmitting pin 326 having a central bore 327 for pressure equalization as previously described. In this embodiment, however, the control piston 310 has a valve 311 constructed unitarily therewith and provided with spools 311a and 311b defining four control edges 311c, 311d, 311e and 311f, co-operating with annular compartments 314 and 314' communicating respectively via duct 317 and 317' with the displacement chambers 318 and 318'. Pressure chambers 316 and 316' and a reservoir chamber 319 are also provided and are connected to the pump 301 and the reservoir 302, respectively, or as described in connection with FIG. 1. In this embodiment as well, a pressure relief valve 304 shunts the intake and discharge sides of the pump while a valve arrangement 305 is provided to control the pressure in chamber 309 to which the control piston 310 is subject. It will be apparent that depending upon the control pressure in chamber 309, the valve 310 is shifted to effect a corresponding displacement of the working piston 321 and the load with the valve 311 closing when equilibrium is reached as described. The force of spring 323, which may be under precompression, is determined by the position of the working piston 321 while the fluid in chambers 318 and 318' locks the piston when the valve is closed. The piston 321 is thus of the double-acting type. The fluid paths in the system of FIG. 3, of course, are similar to those previously described in connection with FIG. 1.

We claim:

1. A fluid-responsive control device, comprising: housing means defining a displacement chamber; a working piston slidably received in said housing means and extending into said chamber; a control piston subjected to control-fluid pressure and movably mounted in said housing means; spring means in said housing means and including a coil-spring arrangement interposed between said working piston and said control piston, said coil-spring arrangement acting on said control piston counter to said control-fluid pressure and with a force determined by the position of said working piston; and valve means operatively connected with said control piston for regulating fluid flow to and from said chamber for maintaining a body of fluid therein adapted to take up external forces applied to said working piston in a blocked position of said valve means, said control piston and said valve means including a spool-valve member provided with axially spaced spools, said housing means defining a valve bore provided with annular compartments co-operating with the spools of said valve member and a control cylinder at one end of said spool-valve member for applying said control-fluid pressure thereto, said spool-valve member, said coil-spring arrangement and said working piston being axially aligned in said housing means, a respective control piston, valve means, coil-spring arrangement and displacement chamber being provided at each axial end of said working piston for alternative operation to displace said working piston in opposite directions.

2. The device defined in claim 1 wherein said coil-spring arrangement is maintained under a precompression to bias said working piston into a neutral position.

3. A fluid-responsive control device, comprising: housing means defining a displacement chamber; a working piston slidably received in said housing means and extending into said chamber; a control piston subjected to control-fluid pressure and movably mounted in said housing means; spring means in said housing means and including a coil-spring arrangement interposed between said working piston and said control piston, said coil-spring arrangement acting on said control piston counter to said control-fluid pressure and with a force determined by the position of said working piston; valve means operatively connected with said control piston for regulating fluid flow to and from said chamber for maintaining a body of fluid therein adapted to take up external forces applied to said working piston in a blocked position of said valve means, said control piston and said valve means including a spool-valve member provided with axially spaced spools, said housing means defining a valve bore provided with annular compartments co-operating with the spools of said valve member and a control cylinder at one end of said spool-valve member for applying said control-fluid pressure thereto, said spool-valve member, said coil-spring arrangement and said working piston being axially aligned in said housing means; and a force-transmitting pin interposed between said spool-valve member and said coil-spring arrangement, said pin being provided with a passage for equalizing fluid pressure on opposite sides of said pin.

4. The device defined in claim 3 wherein said coil-spring arrangement includes a coil spring received in said displacement chamber, a first spring seat shiftable in said chamber and resting against said pin and a second spring seat shiftable in said chamber and resting against said working piston, said spring seats receiving said coil spring between them under pre-compression.

5. The device defined in claim 4 wherein said housing means forms a pair of walls on opposite sides of said chamber, said spring seats respectively lying against said walls in a neutral position of said working piston.

6. The device defined in claim 5, further comprising a fluid-circulating network including a pump connected with said valve means.

7. The device defined in claim 3 wherein said coil-spring arrangement is maintained under a precompression to bias said working piston into a neutral position.

8. A fluid-responsive control device, comprising: housing means defining a displacement chamber; a working piston slidably received in said housing means and extending into said chamber; a control piston subjected to control-fluid pressure and movably mounted in said housing means; spring means in said housing means and including a spring arrangement interposed between said working piston and said control piston, said spring arrangement acting on said control piston counter to said control-fluid pressure and with a force determined by the position of said working piston; and valve means operatively connected with said control piston for regulating fluid flow to and from said chamber for maintaining a body of fluid therein adapted to take up external forces applied to said working piston in a blocked position of said valve means, said control piston and said valve means including a spool-valve member provided with axially spaced spools, said housing means defining a valve bore provided with compartments co-operating with the spools of said valve member and a control cylinder at one end of said spool-valve member for applying said control-fluid pressure thereto, said spool-valve member, said spring arrangement and said working piston being axially aligned in said housing means, a respective control piston, valve means, spring arrangement and displacement chamber being provided at each axial end of said working piston for alternative operation to displace said working piston in opposite directions.

* * * * *